(12) United States Patent
Zhao

(10) Patent No.: US 11,151,901 B2
(45) Date of Patent: Oct. 19, 2021

(54) TRAINING MANIKIN

(71) Applicant: AMBU A/S, Ballerup (DK)

(72) Inventor: Qiaofeng Zhao, Nanan (CN)

(73) Assignee: AMBU A/S, Ballerup (DK)

( * ) Notice: Subject to any disclaimer, the term of this patent is extended or adjusted under 35 U.S.C. 154(b) by 236 days.

(21) Appl. No.: 16/473,139

(22) PCT Filed: Dec. 8, 2017

(86) PCT No.: PCT/DK2017/050417
§ 371 (c)(1),
(2) Date: Jun. 24, 2019

(87) PCT Pub. No.: WO2018/127262
PCT Pub. Date: Jul. 12, 2018

(65) Prior Publication Data
US 2019/0362653 A1 Nov. 28, 2019

(30) Foreign Application Priority Data

Jan. 6, 2017 (CN) .......................... 201710011210.4

(51) Int. Cl.
*G09B 23/28* (2006.01)
*G09B 23/34* (2006.01)
(Continued)

(52) U.S. Cl.
CPC ............ *G09B 23/288* (2013.01); *G09B 23/28* (2013.01); *G09B 23/30* (2013.01); *G09B 23/32* (2013.01); *G09B 23/34* (2013.01)

(58) Field of Classification Search
None
See application file for complete search history.

(56) References Cited

U.S. PATENT DOCUMENTS

| 4,797,104 A | 1/1989 | Laerdal |
| 5,195,896 A | 3/1993 | Sweeney et al. |

(Continued)

FOREIGN PATENT DOCUMENTS

| CN | 101911151 B | 11/2012 |
| CN | 104637384 A | 5/2015 |

(Continued)

OTHER PUBLICATIONS

OEE—Intent to grant communication for related application EP 17 816 417.4, dated Feb. 12, 2021, 41 pages.

(Continued)

*Primary Examiner* — James B Hull
(74) *Attorney, Agent, or Firm* — Faegre Drinker Biddle & Reath LLP

(57) ABSTRACT

A training manikin for practising cardiopulmonary resuscitation, said manikin including a torso part, the torso part including: a base board, a lung plate arranged at a distance to said base board, a chest board, a retaining member, a resilient member positioned between said base board and said lung plate, the resilient member having a first end and a second end opposed to said first end, each first end being connected to the base board and each second end being connected to the lung plate, the resiliency of each resilient member being adapted to simulate the resistance encountered in compressing a human chest, a lung bag positioned between said chest board and said lung plate, wherein the retaining member is adapted to retain the torso part in the storage position.

23 Claims, 10 Drawing Sheets

(51) Int. Cl.
*G09B 23/32* (2006.01)
*G09B 23/30* (2006.01)

(56) References Cited

U.S. PATENT DOCUMENTS

| | | | |
|---|---|---|---|
| 5,312,259 A * | 5/1994 | Flynn | G09B 23/288 434/265 |
| 5,383,786 A | 1/1995 | Køhnke | |
| 5,853,292 A | 12/1998 | Eggert | |
| 6,205,415 B1 | 3/2001 | Butts | |
| 6,530,783 B1 | 3/2003 | McGinnis | |
| 7,223,103 B2 | 5/2007 | Cantrell et al. | |
| 2007/0105082 A1* | 5/2007 | Laerdal | G09B 23/288 434/265 |
| 2007/0264621 A1 | 11/2007 | Nysaether et al. | |
| 2009/0035740 A1 | 2/2009 | Reed | |
| 2009/0148821 A1 | 6/2009 | Carkner | |
| 2009/0215011 A1 | 8/2009 | Christensen | |
| 2010/0285439 A1 | 11/2010 | Mestad et al. | |
| 2010/0291522 A1* | 11/2010 | Cook | G09B 23/28 434/265 |
| 2013/0183648 A1 | 7/2013 | Ianke et al. | |
| 2013/0218055 A1 | 8/2013 | Fossan | |
| 2014/0272869 A1 | 9/2014 | Hambelton | |
| 2015/0125840 A1 | 5/2015 | Pastrick et al. | |
| 2015/0325148 A1 | 11/2015 | Kim | |
| 2018/0303472 A1 | 10/2018 | Matthison-Hansen et al. | |

FOREIGN PATENT DOCUMENTS

| | | |
|---|---|---|
| CN | 103140884 B | 7/2015 |
| EP | 0 560 440 A1 | 9/1993 |
| EP | 1 623 403 B1 | 11/2012 |
| GB | 791741 | 3/1958 |
| WO | WO 2004/100107 A1 | 11/2004 |
| WO | WO 2008/067295 | 6/2008 |
| WO | WO 2009/018334 | 2/2009 |
| WO | WO 2011/060350 | 5/2011 |
| WO | WO 2012/041759 A1 | 4/2012 |
| WO | WO 2012/0141586 | 10/2012 |

OTHER PUBLICATIONS

Second Office action in corresponding Chinese Application No. 201710011210.4, dated Feb. 7, 2020, with English translation, 9 pages.

Third Office action in corresponding Chinese Application No. 201710011210.4, dated Aug. 13, 2020, with English translation of relevant portions, 9 pages.

International Search Report and Written Opinion in corresponding International Application No. PCT/DK2017/050417 dated Jan. 26, 2018.

Chinese webpage http://www.shtaigui.com/jswz/813.html, dated Nov. 12, 2020, with English version of webpage, 5 pages.

Office action in corresponding Chinese Application No. 201710011210.4, dated Nov. 12, 2020, with English translation.

Office action in corresponding Chinese Application No. 201710011210.4, dated Sep. 3, 2019, with English translation.

* cited by examiner

TRAINING MANIKIN

CROSS-REFERENCE TO RELATED APPLICATIONS

This application is a National stage application filed under 35 U.S.C. § 371 of International Application No. PCT/DK2017/050417, filed on Dec. 8, 2017, which claims the benefit of Chinese Patent Application No. 201710011210.4, filed on Jan. 6, 2017, which applciations are incorporated herein by reference thereto.

FIELD OF THE INVENTION

The present invention relates to a training manikin for practising cardiopulmonary resuscitation, the manikin being collapsible into a storage position and expandable into a training position.

BACKGROUND OF THE INVENTION

Out-of-hospital cardiac arrest is one of the major causes of death on a global scale. Even when a cardiac arrests occur in the home, often no cardiopulmonary resuscitation (CPR) is started, since the bi-standers do not know what to do. By the time the emergency services arrive valuable time has been lost and, in many cases, the chance of survival has also been lost.

But when the cardiac arrest is witnessed by a bystander who initiates CPR in the first few minutes of the cardiac arrest, the person's chance of survival will significantly increase.

To perform correct CPR on a human being with no vitals is difficult and requires training. It is a fact that CPR makes a difference and that consistent training is the way forward. Therefor the benefits of training manikins for practicing CPR has been appreciated for years.

Furthermore, mandatory CPR training has in the resent years been added to the school schedule in many countries, since kids are likely to witness a relative having a cardiac arrest at home.

But a majority of the training manikins that are available are both expensive, difficult to assemble and take up a large amount of space.

An example of a resuscitation training manikin, that can be packed into a smaller size, is shown in EP 1 623 403 B1. Here the manikin comprises an inflatable body, which the trainee himself has to use his mouth (or a pump) to inflate.

This renders the task of assembling the manikin prior to use a cumbersome task, depriving the teacher and the trainee of precious minutes of teaching and practising.

Furthermore, if more than one trainee uses the same manikin, and thus the same valve to inflate the manikin with their mouths, there is a high risk of cross-contamination from one trainee to the next.

Lastly, since the amount of air that is filled into the manikin is trainee dependent, there is a risk of either under- or overfilling the manikin, resulting in an incorrect amount of inflation and thus an incorrect training experience when performing and training CPR on said manikin, since a different pressure results in a very different pumping sensation for the trainee.

It is thus sensible to manufacture a training manikin that is simple and quick to use, so that a trainee can easily train and re-train the CPR algorithm (comprising a ventilation part and a chest compression part). The training manikin also forms a good basis for re-training throughout the trainee's life, where a quick brush up of the CPR makes a big difference, even if the training does not happen with a manikin that is completely lifelike.

SUMMARY OF THE INVENTION

An object of the invention and/or of the present disclosure may be seen as to provide a training manikin which avoids, solves or lessens one or more of the above mentioned drawbacks. In particular an object of the invention is to provide a training manikin which is quickly ready to use and takes up a minimal amount of space when not in use.

According to the invention, these and further objects may be met by a training manikin for practising cardiopulmonary resuscitation, the manikin being collapsible into a storage position and expandable into a training position, said manikin comprising a torso part, the torso part comprising;
  a base board,
  a lung plate arranged approximately parallel with and at a distance to said base board,
  a chest board arranged approximately parallel with said base board, and
  a retaining member,
  wherein the torso part further comprises;
  a resilient member positioned between said base board and said lung plate, the resilient member having a first end and a second end opposed to said first end, the first end being connected to the base board and the second end being connected to the lung plate, the resiliency of the resilient member being adapted to simulate the resistance encountered in compressing a human chest,
  a lung bag positioned between said chest board and said lung plate,
  wherein the retaining member is adapted to retain the torso part in the storage position.

Hereby a training manikin is provided, which is easy and fast to change from the storage position to the training position, thereby quickly being ready to use, and likewise is easy and fast to change from the training position to the storage position, wherein the manikin takes up a minimal amount of space when not in use.

This facilitates both quick and easy usage of the training manikin, and in facilities where a plurality of training manikins is required, a minimal amount of storage space.

In an embodiment the retaining member is adapted to, in combination with a force applied by the trainee to the torso part, bring the torso part from the training position to the storage position.

The force is applied by the trainee to either the chest board, when the manikin is positioned on the base board, or to the chest board when the manikin is positioned on the chest board.

The force applied by the trainee results in a decrease of the distance between the base board and the lung plate and/or the base board and the chest board, when the manikin is being brought from the training position to the storage position.

The combination of the force applied by the trainee and the retaining member allows the torso part to swiftly and easily be brought into the storage position where it takes up a minimal amount of storage space.

The retaining member retains the torso part in the storage position, so that no external device and/or packaging is necessary to minimise and/or keep the torso part in the storage position.

In an embodiment the retaining member may be located adjacent to the resilient member.

In an embodiment the retaining member encircles or surrounds the resilient member.

In an embodiment the retaining member surrounds the resilient member, the retaining member surrounding a first side, a top side and a second side opposite of the first side of the resilient member.

In an embodiment the resiliency of the resilient member is biased to bring the torso part from the storage position to the training position.

Meaning that the resilient member if not influenced by any external forces or other elements will automatically bring the torso part from the storage position to the training position.

The resilient member, like the torso part, may be brought into a training position and a storage position.

When the resilient member is in the storage position, the resiliency of the resilient member ensures that an amount of potential energy is stored within the resilient member. This potential energy may then be used to bring the torso part from the storage position to the training position.

When the resilient member is in the training position, the resiliency of the resilient member ensures that the manikin can be used to simulate cardiac massage.

Thus a manikin which is uncomplicated to assemble, quick and easy to bring from the storage position to the training position, and vice versa, without the need for external devices or inflation by mouth, is provided.

The resilient member guides the lung plate and thus the chest board, so that their movement is in a direction to and from the base board approximately parallel to said base board, both in a CPR training situation but also when the torso part is being brought to or from the storage position.

In an embodiment the resilient member provides continuously increasing resistance as the lung plate moves towards the base board.

Alternatively, the resilient member provides stepwise increasing resistance as the lung plate moves towards the base board.

In an embodiment the retaining member comprises a rope drive or strap drive. The rope/strap may comprise a plurality of tiny hooks and loops to connect parts of the strip to itself and/or a part of one strip to part of another strip. The rope preferably being a product such as products sold under the trademark Velcro®.

The retaining member may also be positioned in a storage position and a training position.

When the retaining member is in the storage position, the retaining member may be in a tightened state. Likewise, when the retaining member is in the training position, the retaining member may be in a released and/or relaxed state.

Thus when the retaining member is released from the storage position, the force of the tensioned resilient member in the storage position, forces the lung plate and the chest board away from the base board, so that the torso part is quickly brought to the expanded training position and is ready to use.

In an embodiment the torso part comprises at least two resilient members positioned between said base board and said lung plate.

The at least two resilient members provide a stable movement of the lung plate and feeling for the trainee, when force is applied to the chest board.

In an embodiment the training manikin comprises a head part.

The lung plate may be viewed as being divided into a right side and a left side, the sides being separated by a longitudinal axis through the centre of the lung plate, the axis extending from the head part and down through the centre of the lung plate.

In an embodiment each of the at least two resilient members are connected to the lung plate on each side of the longitudinal axis.

The lung plate may be viewed as being divided into a top side and a bottom side, the sides being separated by a transverse axis through the centre of the lung plate, the transverse axis being perpendicular to the longitudinal axis.

In an embodiment each of the at least two resilient members are connected to the lung plate on each side of the transverse axis.

When the torso part is in the storage position, the lung plate and the base board are arranged approximately parallel to each other with a distance d_storage between each other. When the torso part is in the training position, without any external force applied, the lung plate and the base board are arranged approximately parallel to each other with a distance d_training between each other.

In an embodiment d_training is larger than d_storage.

In an embodiment the training manikin further comprises a lung bag, said lung bag being positioned between the chest board and the lung plate.

Providing a lung bag as a separate element allows movement of the chest board, when air is blown into the lungs, which movement is independent of the elements that provides for the compression training part of the manikin (e.g. the resilient member, base board etc.).

Thereby the expansion of the lung bag and thus the elevation of the chest board will simulate the movement of a human chest during the ventilation part of the CPR training, where it is crucial to blow air until it is visible that the chest rises.

Since the lung bag is positioned adjacent to the chest board, the lung bag will easily influence the chest board and provide for movement of the same when the lung bag is filled with air.

In an embodiment the lung bag is attached to the lung plate. The attachment may be done by means of an adhesive.

In an embodiment the torso part further comprises a flexible side wall adapted to connect said chest board and said base board.

The flexible side wall may be permanently attached to said chest board.

In an embodiment the flexible side wall is connected to the entire circumference of the chest board.

In terms of the present disclosure, the term "circumference" is to be understood as an enclosing boundary of an element, the element may have any shape.

The flexible side wall may be integrally moulded with a part of the chest board.

In an embodiment the flexible side wall is integrally moulded with the entire circumference of the chest board.

In an embodiment the flexible side wall is integrally moulded with a skin of the chest board.

By providing a chest board and an appertaining flexible side wall, a simple torso outer part is provided, which is easy and cheap to produce, whilst allowing for easy collapse into the storage position and easy expansion into the training position.

In an embodiment the flexible side wall comprises a chest end and an opposite base end, the chest end being attached to said chest board.

In an embodiment the base end may be releasably attached to the base board.

The flexible side wall extends from the chest board to the base board in the entire circumference of the chest board.

In an embodiment the chest end of said side wall is connected to said chest board along the edge of the circumference of said chest board.

In an embodiment the side wall is releasably connected to the base board along the edge of the circumference of said base board.

In an embodiment the side wall is adapted to be releasably attached to the chest board.

In an embodiment the chest end is connected to the chest board by means of a snap lock and/or a click lock and/or a shrink fit.

In an embodiment the base end is connected to the base board by means of a snap lock and/or a click lock and/or a shrink fit.

In an embodiment the flexible side wall is a collapsible and/or extendable side wall. Preferably in the form of a bellows.

This allows for easy expansion and collapse of the torso part and also for flexible movement of the side wall during CPR training, thereby simulating the movement of the torso of a person during CPR.

In the terms of the present disclosure, the term "collapsible" is to be interpreted as meaning; able to be folded into a smaller size.

The flexible side wall is to be understood as being flexible in any direction.

The flexible side wall having a storage position and a training position. In the storage position the flexible side wall is collapsed into a smaller size, so as to facilitate the smaller size of the torso part in the storage position. In the training position the flexible side wall is unfolded/expanded, so as to bring the chest board into the training position.

Since the side wall is flexible it allows for the movement (compression/expansion) of the torso part during CPR training.

In an embodiment the chest board comprises a male part and the lung plate comprises a matching female part, the male and female parts being adapted to guide the placement of said chest board relative to the lung plate.

Said male and female parts provide for easy and correct assembly of the torso part.

Alternatively or additionally the chest board comprises a male part and the lung bag comprises a matching female part, the male and female parts being adapted to guide the placement of said lung bag relative to the chest board.

In an embodiment the male part of the chest board penetrates the female parts of the lung bag and the lung plate, when the torso part is assembled.

This ensures that the lung bag is correctly positioned between the chest board and the lung plate during assembly and following in use, so that the lung bag can perform its intended function.

The male part may be a protrusion e.g. a boss. The female part may be an aperture.

In an embodiment the chest board comprises a locking member adapted for attaching the chest board to said lung plate.

In an embodiment the chest board is releasably attached to the lung plate.

The locking member may be a snap lock.

By ensuring that the chest board is at all times correctly positioned in relation to the lung plate, the force from a trainee during CPR training will be correctly transferred from the chest board to the lung plate and the resilient members, thereby providing the desirable feeling of movement of the torso part for the trainee during the CPR training.

In an embodiment the locking member is adapted for establishing a limited clearance distance so that the chest board can move in relation to the lung plate.

In the terms of the present disclosure, the term "clearance distance" is to be understood as; an intervening distance allowing free play between parts. In this case this means that the locking member releasably attaches the chest board to the lung plate, but allows the chest board to move towards and away from within a distance (i.e. the clearing distance) the lung plate, whilst the chest board is still attached to said lung plate.

In an embodiment the locking member is attached to and extends away from the chest board.

The clearance distance may be defined by the length of the locking member.

The clearance distance allows the chest board to move away from the lung plate, when the lung bag is inflated during inflow of air into the lung bag.

The locking member further acts as a guiding post for correct positioning of the chest board in relation to the lung plate, where the clearance distance allows for an appropriate visual appearance of the chest board rising when the trainee blows air into the manikin. Thereby providing a realistic impression during training.

In an embodiment the chest board comprises two locking members.

Additionally, in an embodiment the lung plate comprises two apertures for receiving the two locking members.

In an embodiment the manikin further comprises a self-inflatable head part.

This further ensures that the entire manikin is quick and easy to bring from a storage position to a training position without the need for external devices or inflation by mouth.

The self-inflatable head is also collapsible, which ensures that the entire manikin may be brought into a smaller size when in the storage position.

In an embodiment the resilient member is a steel coil spring.

This allows the resilient member to be compressed into a smaller size, without the need for expansion in any direction, such as would happen if e.g. a rubber element was used as resilient member. The rubber element being forced to expand in a radial direction, when an external force is applied on top of it.

Further the spring will build up potential energy when put into the compressed storage position, which energy will be utilized to bring the torso part from the storage position into the training position.

The resiliency of the spring in the training position will simulate the feel of a chest, when a trainee applies a force to the chest board during CPR training.

In an embodiment the torso part comprises 3 resilient members.

In an embodiment the torso part comprises 4 resilient members.

As previously mentioned, the lung plate may be viewed as being divided into 4 areas (top-left, bottom-left, top-right, bottom-right), the areas being separated by the longitudinal axis through the middle of the lung plate, the axis extending from the head part and down through the centre of the lung plate, and by a transverse axis through the centre of the lung plate, the transverse axis being perpendicular to the longitudinal axis.

In an embodiment each of the 4 resilient members are connected to the lung plate in each of the 4 areas.

In an embodiment the lung plate has an approximately rectangular shape and the 4 resilient members are connected to the lung plate near each corner of said lung plate.

Thereby providing a stabile movement of the lung plate and feeling for the trainee, when force is applied to the chest board.

In an aspect the invention relates to a method for bringing a training manikin for practising cardiopulmonary resuscitation from a collapsed, storage position and to an expanded, training position, the method comprising the steps of;
1) providing a torso part in a collapsed, storage position, the torso part comprising;
   a base board,
   a lung plate arranged approximately parallel with and at a distance to said base board,
   a chest board arranged approximately parallel with said base board,
   a retaining member adapted to retain the torso part in the storage position,
   a resilient member positioned between said base board and said lung plate, the resilient member having a first end and a second end opposed to said first end, the first end being connected to the base board and the second end being connected to the lung plate, the resiliency of the resilient member being adapted to simulate the resistance encountered in compressing a human chest, the resilient member being positioned in a tensioned, storage position wherein the resilient member is adapted to build op potential energy,
   a lung bag positioned between said chest board and said lung plate,
2) releasing the retaining member from the storage position,
wherein when the retaining member is released from the storage position, the tensioned resilient member is also released from the storage position, and the force of the potential energy from the resilient member forces the lung plate and the chest board away from the base board.

This ensures that the torso part is quickly brought to its training position and is ready to use.

In terms of the present disclosure, the term "collapsible" may be defined as being capable of decreasing in size.

In terms of the present disclosure, the term "expandable" may be defined as being capable of increasing in size.

In terms of the present disclosure, the term "self-inflatable" may be defined as being capable of inflating itself to a larger size.

THE DRAWINGS

The invention will now be described in detail based on non-limiting exemplary embodiments and with reference to the drawings, on which:

Figure 3:
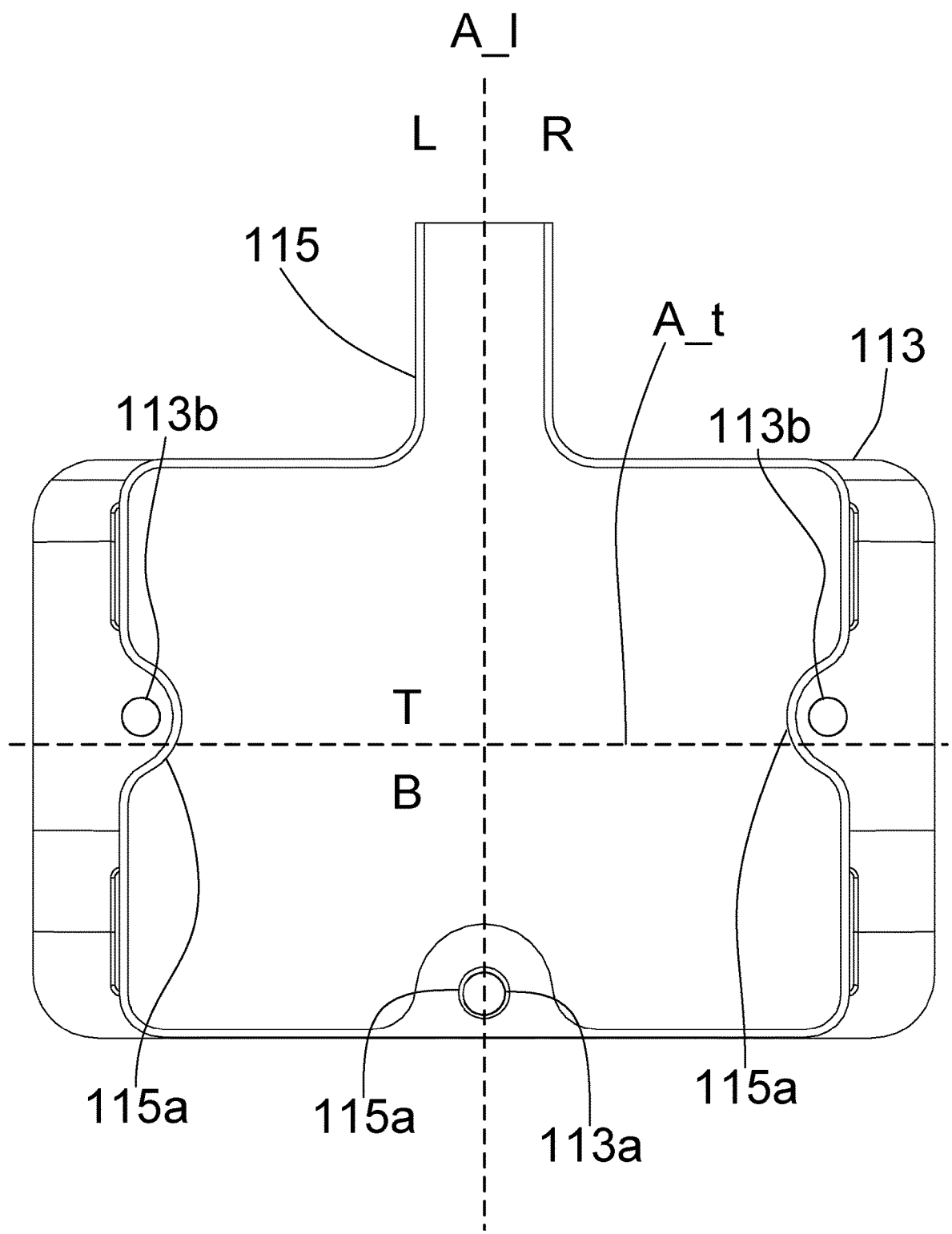

FIG. 3. shows a top view of a lung bag and a lung plate according to an embodiment of the invention.

Figure 1:
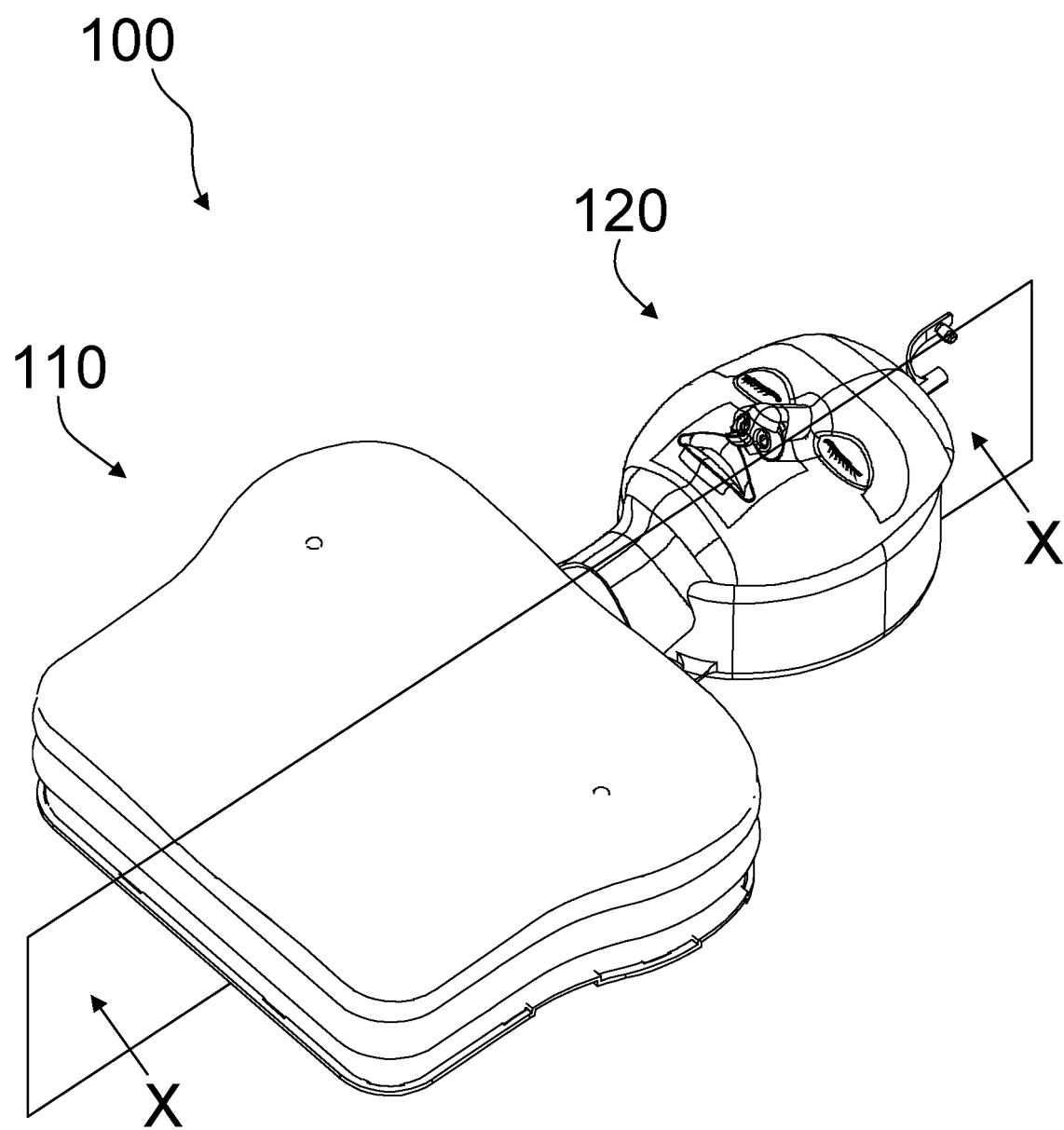
FIG. 1 shows a perspective view of a training manikin according to the present invention.
Figure 4:
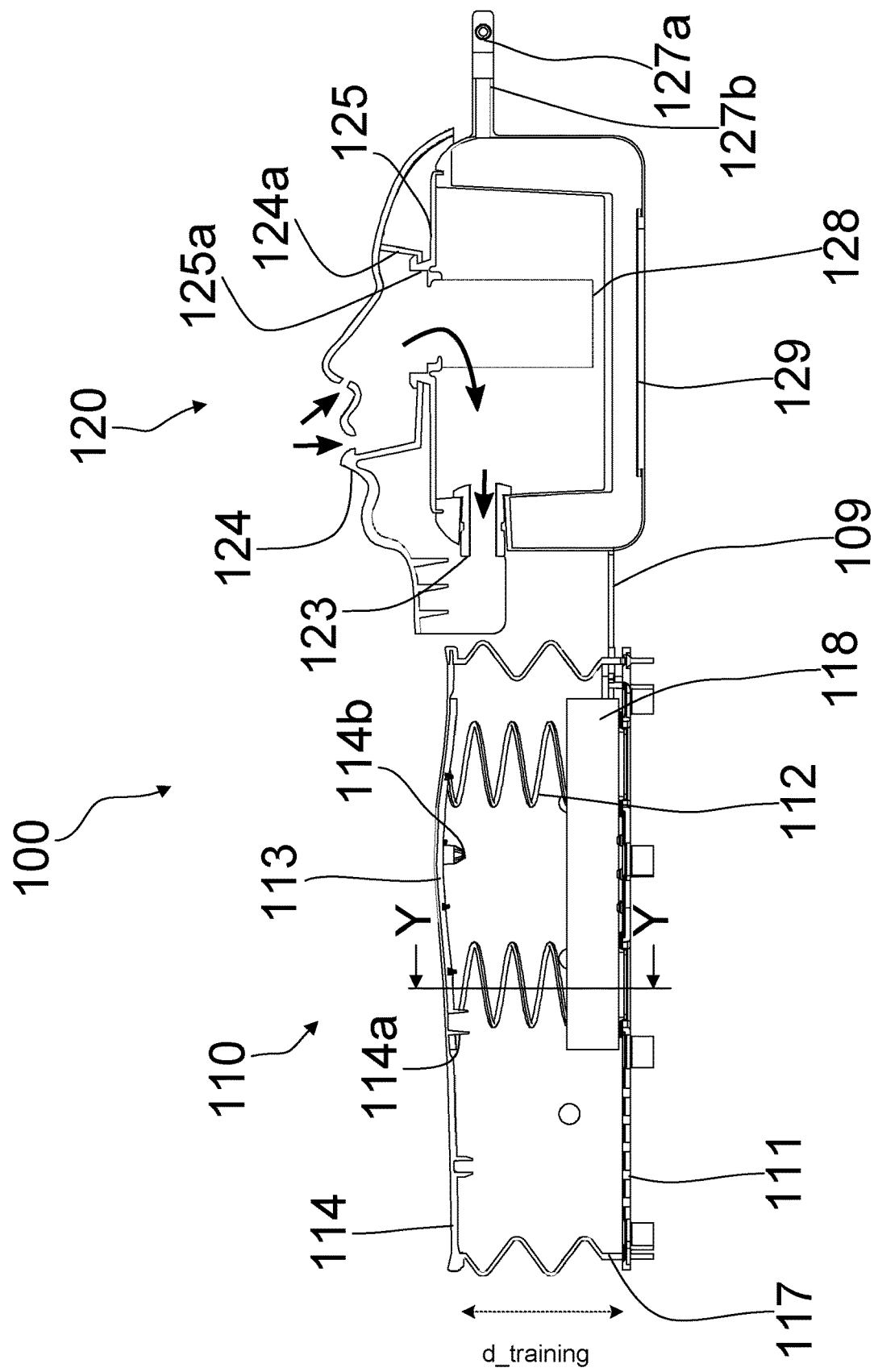

FIG. 4 is a cross-sectional view of the training manikin shown in FIG. 1.

Figure 5:
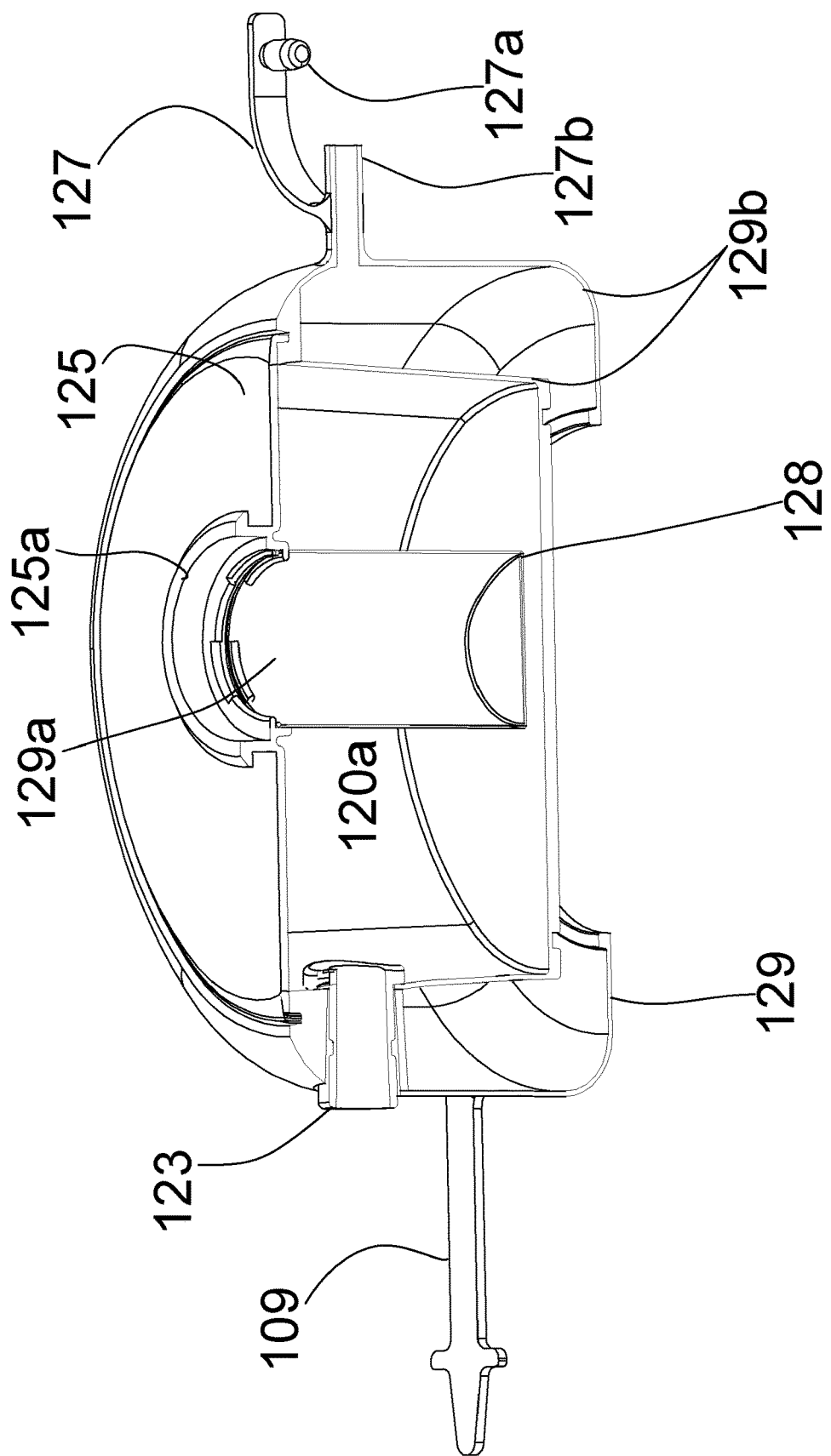

FIG. 5 is a cross-sectional view of a head part according to an embodiment of the invention.

Figure 6:
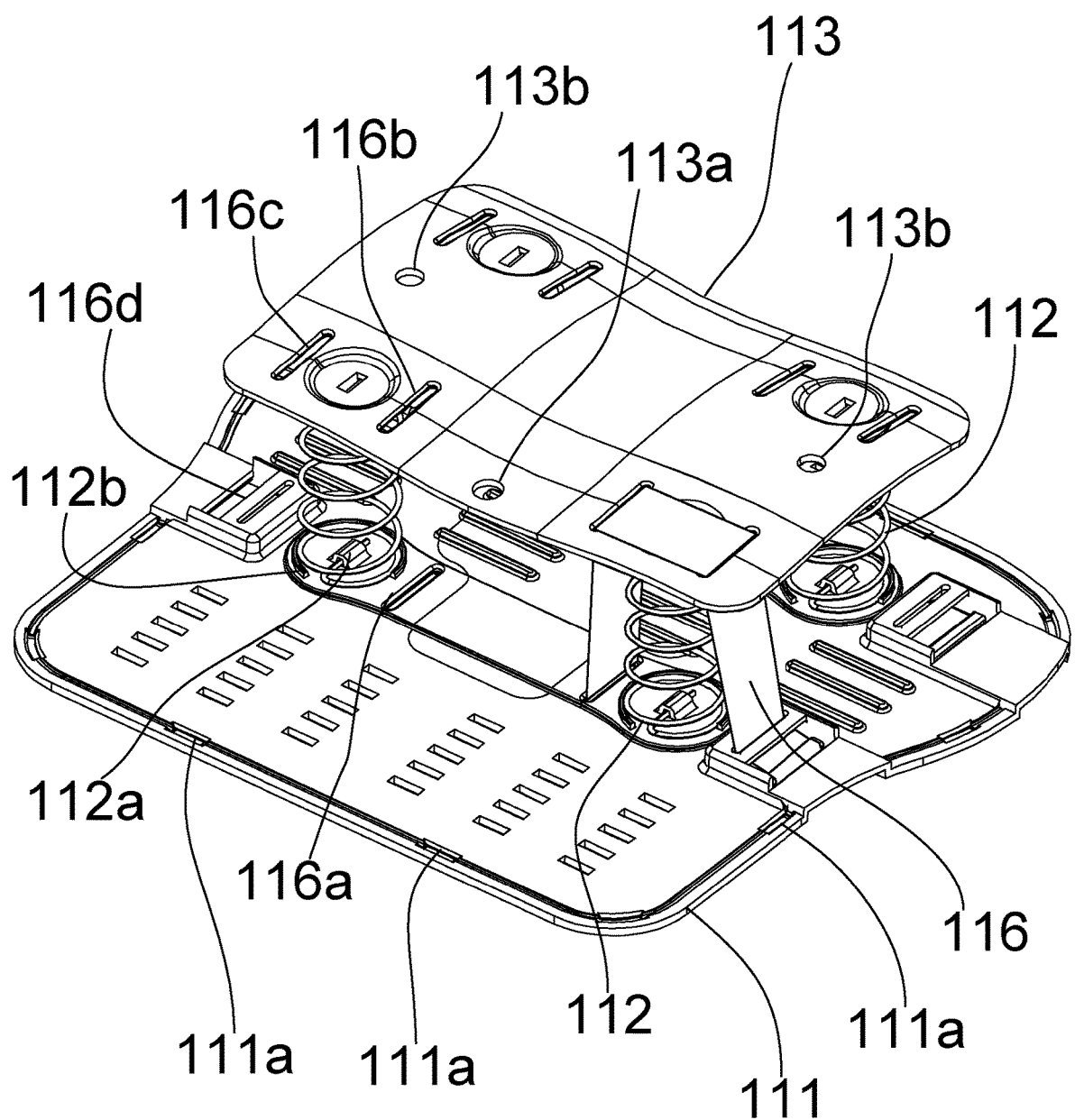

FIG. 6 shows a perspective view of parts of the torso part of the training manikin according to an embodiment of the invention.

Figure 7:
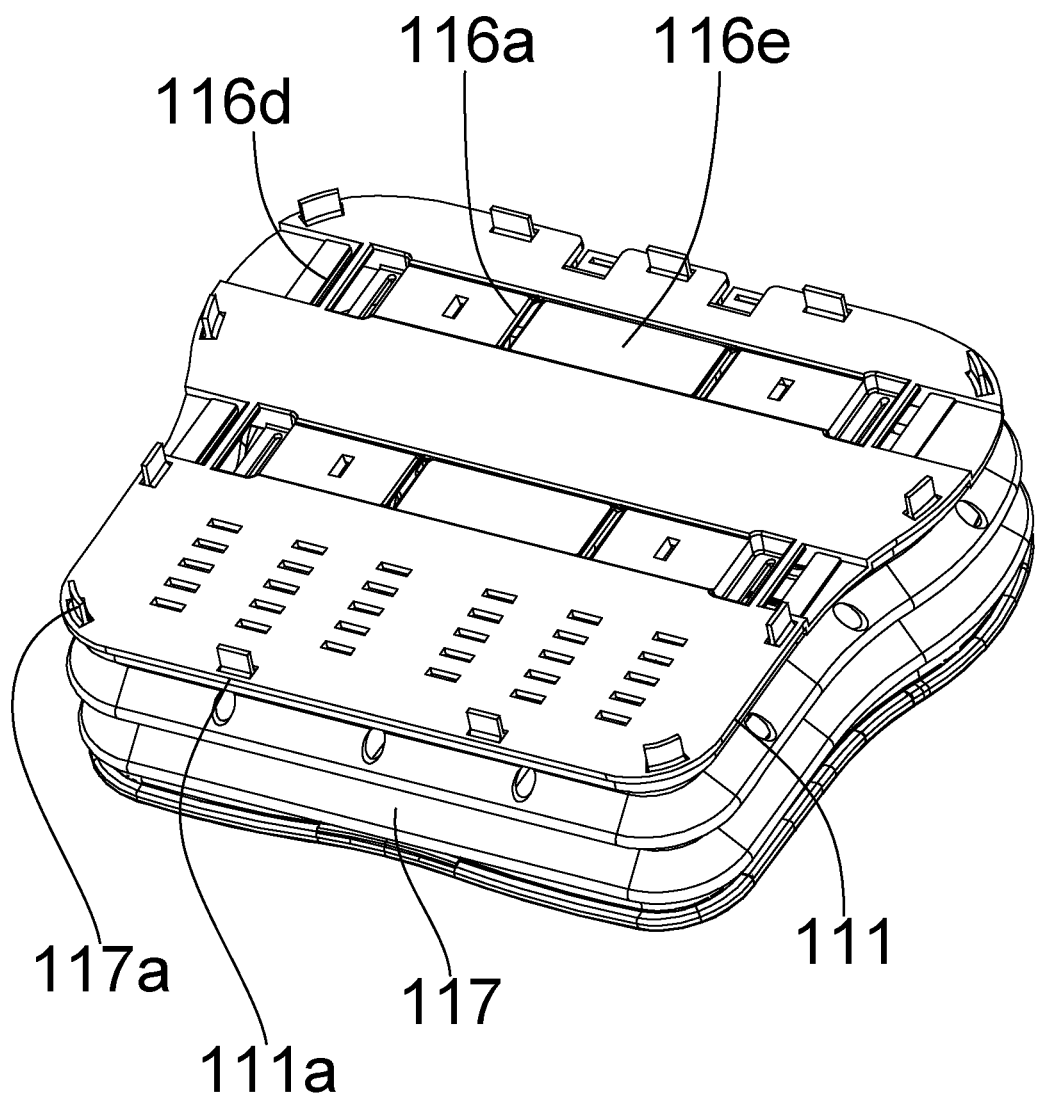

FIG. 7 shows a bottom view of the torso part of the training manikin according to an embodiment of the invention.

Figure 8:
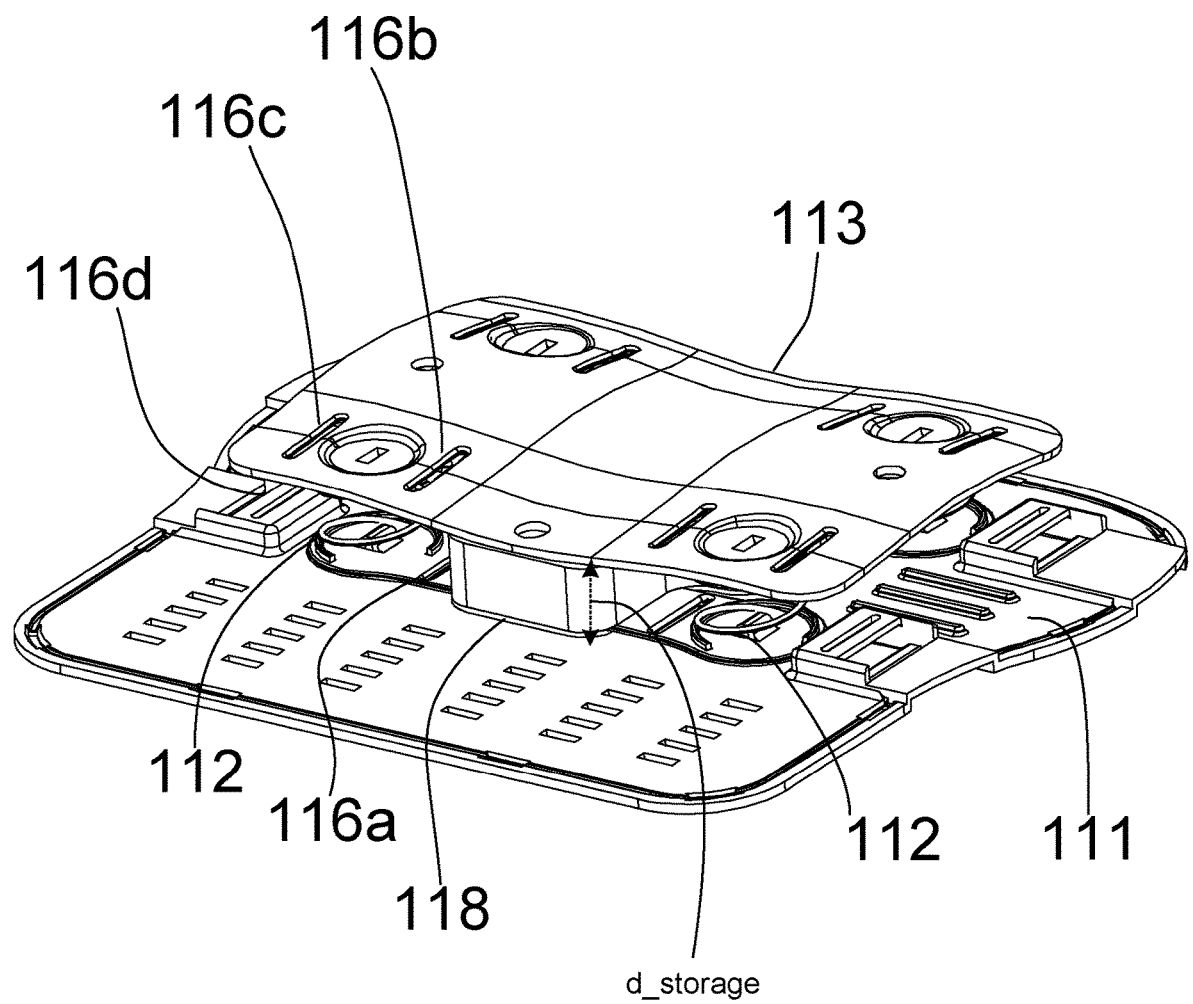

FIG. 8 shows a perspective view of parts of the torso part of the training manikin in a storage position.

Figure 9:
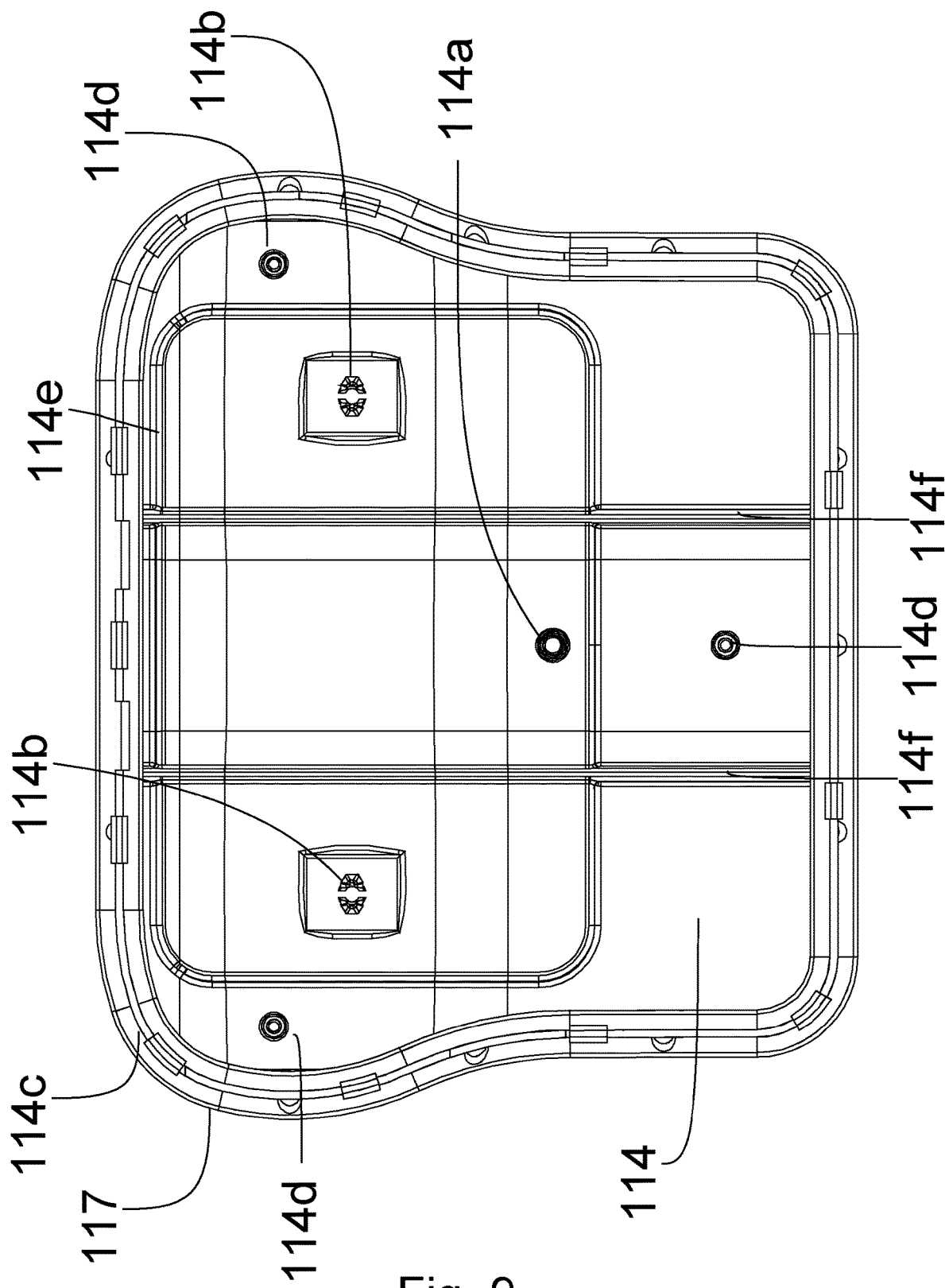

FIG. 9 shows a bottom view of a chest board and a side wall according to an embodiment of the invention.

Figure 10:
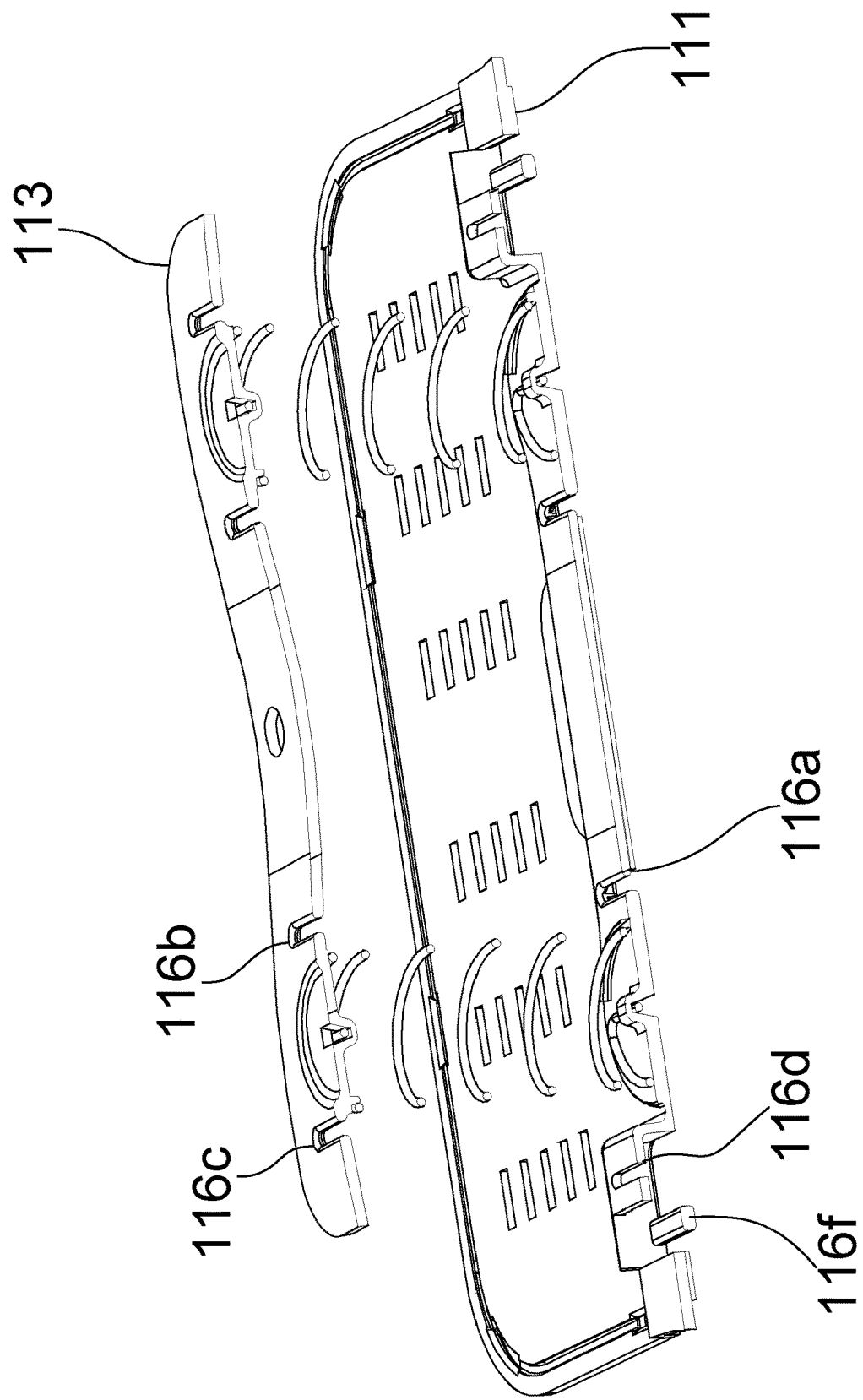

FIG. 10 is a cross-sectional view of a part of the torso part according to an embodiment of the invention.

DESCRIPTION OF DETAILED EMBODIMENTS OF THE INVENTION

Referring to FIG. 1, an embodiment of a training manikin 100 is shown in perspective view. The training manikin 100 comprises a head part 120 and a torso part 110.

The torso part 110 is arranged in a training position. The head part 120 is almost arranged in the training position. A sealing member 127 in the form of a plug is open. For the head part 120 to be completely in the training position, the plug must be closed.

The plane X indicates the cross section of the view shown in FIG. 4.

Figure 2:
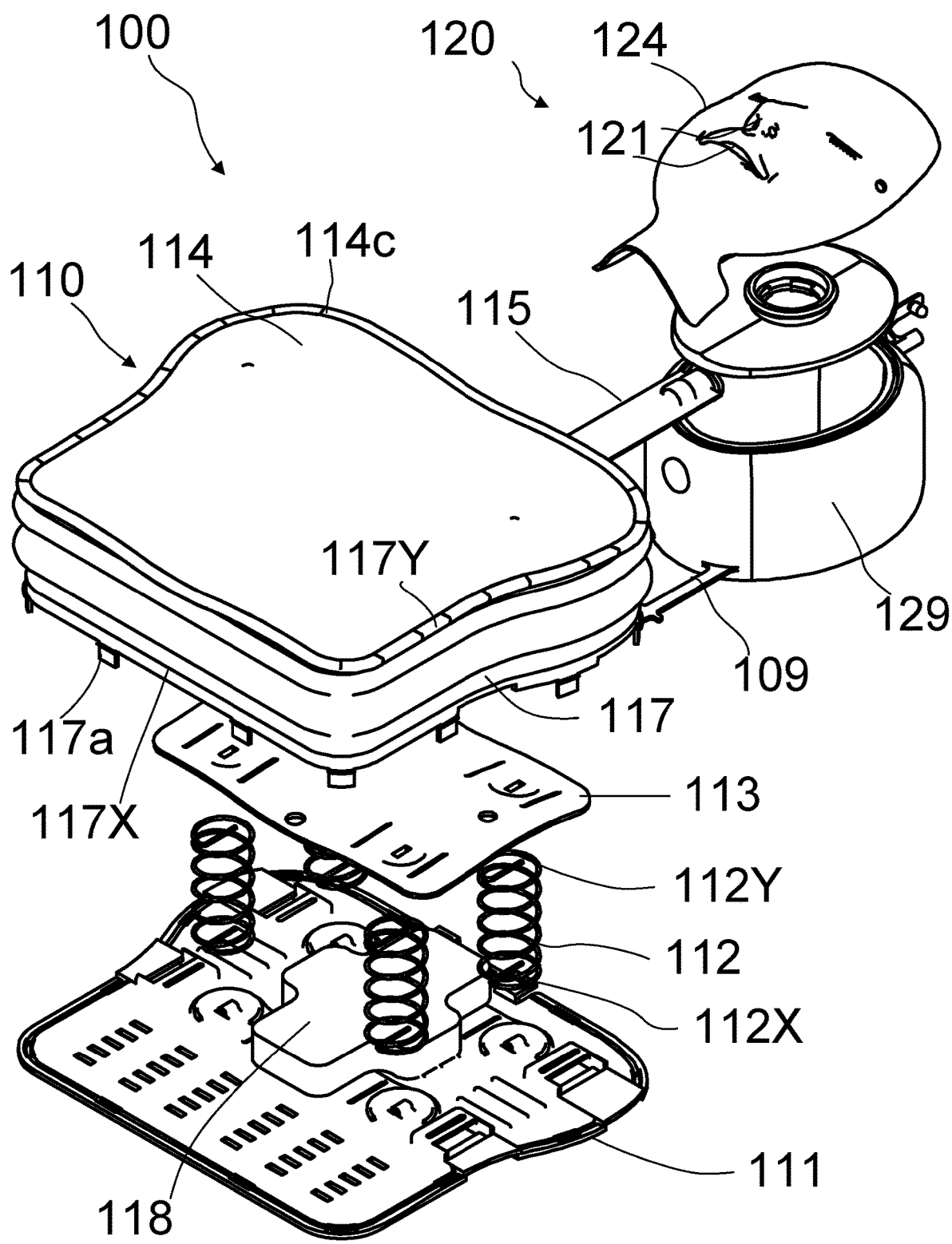
FIG. 2 shows an exploded view of the training manikin shown in FIG. 1.

Referring to FIG. 2, which shows an exploded view of the training manikin 100 shown in FIG. 1.

The head part 120 comprises a face piece 124, which is formed to have a similar appearance as a human face. Said face piece 124 comprises a mouth/nose opening 121 for a trainee to blow air into the manikin during a ventilation part of CPR training.

The head part 120 further comprises a main head element 129. The face piece 124 may be releasably attached to the main head element 129.

The main head element 129 is a self-inflatable element. The main head element 129 has an oval shape. The main head element 129 is formed of a double wall.

The manikin 100 further comprises a torso part 110.

The head part 120 is releasably connected to the torso part 110 via two attachment members 109 (only one is shown in this view). The attachment members 109 are connected to the main head element 129 and are releasably connected to a base board 111.

The attachment members 109 are flexible members. This allows the entire head part 120 to be folded down along a base board 111 or a chest board 114, when the manikin is in the storage position.

The attachment members 109 may be integrally formed with the main head element 129.

The torso part 110 comprises the base board 111 and the chest board 114, the chest board 114 being arranged approximately parallel with said base board 111.

Both the chest board 114 and the base board 111 has a torso-like surface shape, approximately corresponding to each other in size.

The torso part 110 further comprises a lung plate 113. The lung plate 113 has an approximately rectangular shape. The lung plate 113 is slightly curved towards the base board in the centre area of the lung plate 113. This is to correspond to a slightly curved shape of the chest board 114 imitating the slightly curved shape of a sternum in a human chest.

The lung plate 113 is arranged approximately parallel with and at a distance to said base board 111. The lung plate 113 is also approximately parallel with said chest board 114.

The torso part 110 further comprises a resilient member 112. In the specific embodiment shown on FIG. 2, the torso part comprises 4 resilient members 112.

The resilient members 112 are positioned between said base board 111 and said lung plate 113.

The resilient member having a first end 112X and a second end 112Y opposed to said first end. Where each first end 112X is connected to the base board 111 and each second end 112Y is connected to the lung plate 113.

Each resilient member 112 is a steel coil spring.

Each resilient member 112 has a resiliency which is adapted to simulate the resistance encountered in compressing a human chest, when a force is applied to the torso part 110 by a trainee performing CPR training.

The torso part 110 further comprises a lung bag 115. A first part of the lung bag 115 is positioned between said chest board 114 and said lung plate 113 (this part is shown on FIG. 3). A second part of the lung bag 115 extends out of the torso part 114 and is connected to the head part 120. Said second part comprises a through hole capable of transporting air blown into the head part 120 to the first part of the lung bag, that is arranged in the torso part 110.

The second part may be in the form of a flat tube, which expands to a more circular shape, when air is blown into it through the through hole.

The torso part 110 further comprises a retaining member 116 (not visible on FIG. 2, but shown in FIG. 6). The retaining member 116 is adapted to retain the torso part 110 in a storage position.

When a force is applied by the trainee to the chest board 114 during CPR training, the chest board 114 and the lung plate 113 are moved down towards the base board 111, which results in a decrease of the distance between the base board 111 and the lung plate 113, and the distance between the base board 111 and the chest board 114.

The same decrease in distance occurs when the manikin 100 is being brought from the training position to the storage position.

The resilient members 112 provide a stable movement of the lung plate 113 and the chest board 114 and feeling for the trainee, when force is applied to the chest board 114.

The resilient members 112 also guides the lung plate 113 and thus the chest board 114, so that their movement is in a direction to and from the base board 111, approximately parallel to said base board 111, both in a CPR training situation but also when the torso part 110 is being brought to or from the storage position.

The resiliency of the resilient members 112 is biased to bring the torso part 110 from the storage position to the training position.

Meaning that when the resilient members 112 are in the storage position, the resiliency of the resilient members 112 ensures that an amount of potential energy is stored within the resilient member 112. This potential energy may then be used to bring the torso part 110 from the storage position to the training position.

The resilient members 112 provide continuously increasing resistance as the lung plate 113 is moved towards the base board 111.

When the resilient members 112 are in the training position, the resiliency of the resilient member ensures that the manikin 100 can be used to simulate cardiac massage.

The torso part 110 further comprises a flexible side wall 117. The flexible side wall 117 is adapted to establish a connection between said chest board 114 and said base board 111.

The flexible side wall 117 is a collapsible side wall in the form of a bellows.

The flexible side wall 117 comprises a chest end 117Y and an opposite base end 117X, the chest end being attached to said chest board.

The chest end 117Y of the flexible side wall 117 is integrally moulded with the entire circumference 114c of the chest board 114.

The base end 117X of the flexible side wall 117 is releasably attached to the base board 111 via snap lock protrusions 117a.

A plurality of snap lock protrusions 117a are arranged at a distance to each other along the circumference of the base end 117X of the flexible side wall 117.

As shown on FIG. 7, the snap lock protrusions 117a engages with a plurality of matching apertures 111a along the circumference of the base board 111, when the manikin is assembled.

The flexible side wall 117 extends from the chest board 114 to the base board 111 in the entire circumference of the chest board 114.

The flexible side wall 117 is releasably connected to the base board 111 along the edge of the circumference of said base board 111.

The torso part 110 further comprises a resisting element 118. The resisting element 118 is a foam element.

The resisting element 118 is arranged on the base board 111, between said base board 111 and the lung plate 113.

The resisting element 118 stops the movement of the lung plate 113 towards the base board 111, when a force is applied to the chest board 114.

The resisting element 118 thus ensures that a correct travelled distance of the chest board 114 and the lung plate 113 towards the base board 111 is obtaining during CPR practice.

This travel distance corresponds approximately to a distance travelled by the chest when performing CPR on a human. The travelled distance is approximately 5-7 cm.

The resisting element 118 has a cross-like shape. Each leg of the cross-like shape extends towards an open space area between two resilient members 112.

Turning to FIG. 3, which shows a top view of the lung bag 115 and the lung plate 113 according to an embodiment of the invention.

The lung bag 115 is arranged adjacent to the lung plate 113, the first part of the lung bag 115 abutting said lung plate 113.

The lung bag 115 is arranged between the lung plate 113 and the chest board (not shown here). Thus the lung bag influences the chest board and provide for movement of the same when the lung bag is filled with air.

The lung bag 115 is attached to the lung plate 113 by means of an adhesive.

The lung plate 113 comprises three female parts in the form of three openings 113a, 113b. The lung bag 115 also comprises a female part 115a.

The female parts match appertaining male parts in the form of protrusions on the chest board (shown in FIG. 4 as 114a and 114b).

The female parts 113b are adapted to guide the placement of said chest board relative to the lung plate 113.

The female parts 113a, 115a are adapted to guide the placement of said lung bag 115 relative to the chest board.

The lung bag 115 also comprises two indentation parts 115a, which ensures that the male part of the chest board can penetrate the female parts 113b of the lung plate 113 when the manikin is assembled.

The female part 113a of the lung plate 113 and the female part 115a of the lung bag 115 are aligned with each other so as to establish one collective opening.

One of the male parts of the chest board (114a on FIG. 4) penetrates the female parts 115a, 113a of the lung bag 115 and the lung plate 113, when the torso part is assembled, to ensure that the lung bag 115 is correctly positioned between the chest board and the lung plate during assembly and following during use.

The lung plate 113 may be divided into a right side R and a left side L, the sides being separated by a longitudinal axis A_l through the centre of the lung plate 113, the axis A_l extending from the head part and down through the centre of the lung plate 113.

As seen for example in the embodiment shown on FIG. 2, two of four resilient members 112 are connected to the lung plate 113 on the right side R of the longitudinal axis A_l. The two other resilient members 112 are connected to the lung plate 113 on the left side L of the longitudinal axis A_l.

The lung plate may also be divided into a top side T and a bottom side B, the sides being separated by a transverse axis A_t through the centre of the lung plate 113, the transverse axis A_t being perpendicular to the longitudinal axis A_l.

Two of the four resilient members 112 are connected to the lung plate 113 on the top side T of the transverse axis A_t. The two other resilient members 112 are connected to the lung plate 113 on the bottom side B of the transverse axis A_t.

Referring to FIG. 4, which shows a cross-sectional view of the training manikin shown in FIG. 1 along the X plane.

The Y plane indicates the cross-sectional view shown in FIG. 10.

The manikin 100 is shown in the training position, wherein the torso part 110 and the head part 120 are both expanded to their training position.

The arrows indicate the route of air blown into the head part 120 via the nose/mouth opening 121 in the head piece 124 by the trainee during the ventilation part of CPR training.

The air travels from the face piece 124 and into the main head element 129.

The head part 120 will now be explained in detail with reference to FIGS. 4 and 5.

The head part 120 comprises a main head element 129. The main head element 129 comprises a double walled structure 129b forming a compartment within the double wall.

The head part 120 further comprises a sealing element 125 with a protruding sealing ring 125a surrounding a head opening 129a, which ring 125a matches an appertaining sealing opening 124a of the face piece 124. The sealing ring 125a and sealing opening 124a ensures the air that is blown into the face piece 124 will be directed into an internal area 120a of the head part 120.

The sealing element 125 is connected to the main head element 129.

The face piece 124 is releasably attached to the sealing ring 125a via the sealing opening 124a.

A mesh support structure 128 may be arranged within the internal area 120a of the head part 120. The internal area 120a being in fluid communication with the head opening 129a.

The mesh support structure 128 is adapted to support a disposable ventilation bag (not shown), which may be arranged in the internal area 120a and head opening 129a, to ensure, that no cross contamination occurs between users of the same training manikin, since each trainee applies a new disposable bag prior to use of the training manikin The face piece 124 is removed prior to placement of the disposable ventilation bag. The face piece 124 may be wiped with an antibacterial solution prior to use to remove any residue from a previous user.

Since the entire face piece 124 is removable and thus may be subjected to thorough cleaning, the risk of cross contamination is significantly reduced.

The head part 120 further comprises a sealing member 127 arranged in relation to the main head element 129. The sealing member in the form of a plug comprises a plug opening 127b and a plug lid 127a.

The main head element 129 is a self-inflatable element. The head element 129 is formed as an elastic double walled element in fluid communication with the plug 127.

The head element 129 is biased towards the inflated training position. So that when the plug is open, air is drawn into the compartment between the double walls 129b of the head element 129, until the head element reaches the inflated training position. This is an automatic procedure that occurs due to the elasticity and/or biased state and/or under-pressure of the head element 129.

When the head element 129 has obtained the inflated training position, the plug lid 127a is inserted into the plug opening 127b, thereby creating a closed compartment of air within the double walls 129b of the head element 129.

When the head element 129 is brought into the storage position, the plug lid 127a is removed from the plus opening 127b so as to establish fluid communication with the compartment within the double walls 129b of the head element 129 and the surrounding air.

If a trainee applies a force to the head part 120, the air within the compartment of the head element 129 is expelled through the plug opening 127b.

When the head part 120 is completely compressed/collapsed, the plug lid 127a is inserted into the plug opening 127b. This creates an under-pressure within the compartment within the double walls 129b of the head element 129. The under-pressure ensures that the head part 120 remains in the collapsed, storage position, until the plug lid 127a is removed, and air is again automatically drawn into the head element 129, which begins to expand once again.

The head part 120 also comprises a connector 123. The connector 123 is connected to the part of the lung bag (not shown) that extends from the torso part 110, as shown on FIG. 2, and establishes fluid communication between the mouth/nose opening 121 of the head piece 124, the head opening 129a, the internal area 120a and the lung bag, when the disposable ventilation bag is not inserted into the head opening 129a.

The connector 123 extends through the double walled structure of the main head element 129. The connector 123 has a cylindrical shape.

The connector 123 comprises means for attaching the lung bag to it.

When the disposable bag is inserted in the head opening 129a and the internal area 120a, the disposable bag establishes a seal with the sealing ring 125a ensuring that approximately all of the air that is blown into the face piece 124 is directed into the disposable bag.

When air enters the disposable bag situated in the head opening 129a and within the internal space 120a of the head part 120, the air will expand the disposable bag, which expansion will displace air already present within the internal space 120a. This air will be displaced into the lung bag via the connector 123, which air will expand the lung bag, which in turn will elevate the chest board so as to simulate the rise of a human chest during CPR.

Returning to FIG. 4 again and the cross sectional view of the torso part 110, which shows the interaction of the different parts of the torso part 110 in a training position. The retaining member is not shown.

When the torso part 110 is in the training position, without any force applied by a trainee, the lung plate 113 and the base board 111 are arranged approximately parallel to each other with a distance d_training between each other.

When the torso part is in the storage position (as seen on FIG. 8), the lung plate 113 and the base board 111 are still arranged approximately parallel to each other but with a distance d_storage between each other.

It is to be understood that d_training is larger than d_storage, and when CPR training is performed, the distance between the lung plate 113 and the base board 111 is continuously decreased (going toward d_storage) when force is applied to the torso part, and increased (going towards d_training) as the force is released from the torso part 110.

As previously mentioned and seen on FIG. 3, the lung plate 113 comprises openings 113a, 113b (not shown on FIG. 5) and the lung bag also comprises an opening 115a (the lung bag is not shown on FIG. 5).

The openings match appertaining male parts in the form of protrusions 114a, 114b on the chest board 114.

The protrusion 114a is shaped as a cylinder extending away from said chest board 114.

The openings 113a, 113b and protrusions 114a, 114b are adapted to guide the placement of said chest board 114 relative to the lung plate 113.

The protrusion 114a penetrates the female parts 115a, 113a of the lung bag and the lung plate 113, when the torso part 110 is assembled, to ensure that the lung bag is correctly positioned between the chest board 114 and the lung plate 113 during assembly and following during use.

The protrusion 114b of said chest board 114 is a locking member adapted for releasably attaching the chest board 114 to said lung plate 113.

The locking member 114b is formed as a snap lock.

The locking member 114b extends away from the chest board 113 and comprises a stem part and a head part (the head part is shown in FIG. 9). The locking member 114b penetrates the opening 113b of the lung plate 111 and establishes a limited clearance distance, so that the chest board 114 can move in relation to the lung plate 113, but still be attached to it.

The limited clearance distance is defined by the length of the stem part of the locking member 114b, the stem part being delimited by the head part and the chest board 114. The clearance distance allows the chest board 114 to move towards and away from the lung plate 113 within a distance (i.e. the clearing distance) whilst the chest board is still attached to said lung plate.

Thus the clearance distance allows for an appropriate visual appearance of the chest board 114 rising when the trainee blows into the manikin 100. Thereby providing a realistic impression during CPR training.

The locking member 114b further acts as a guiding post for correct positioning of the chest board 114 in relation to the lung plate 113.

The chest board 114 comprises two locking members as seen on FIG. 9.

Turning to FIG. 6, which shows a perspective view of parts of the torso part 110 of the training manikin 100 according to an embodiment of the invention. The torso part 110 is shown in the training position, where the resilient members 112 in the form of 4 coil springs are expanded.

The resilient members 112 may be expanded to a resting stage, or only be expanded a partial amount, the expansion being controlled by the retaining members 116.

Only one retaining member 116 is shown, but the skilled person will understand, that a retaining member 114 may be located in relation to each resilient member 112.

This embodiment thus comprising 4 retaining members 116 arranged in relation to the 4 resilient members 112.

The retaining member 116 is adapted to retain the torso part 110 in the storage position.

The retaining member 116 may also be adapted to retain the torso part 110 in the training position.

Each retaining member 116 is located adjacent to a resilient member 112.

The retaining member 116 is shown as a strap, which surrounds the resilient member 112 in the form of a coil spring, so that when the strap 116 is tightened, the spring is compressed.

The resilient members 112 in the form of springs are attached at each end to the lung plate 113 and the base board 111 respectively.

The attachment of each resilient member 112 is assisted by a first retainer element 112a, wherein a part of one of the ends of the resilient member 112 is inserted, and by a second retainer element 112b.

The first retainer element 112a being in the shape of a cylinder with a through hole for the end of the resilient member. The second retainer element 112b being a circular elevated area with a diameter approximately equal to the diameter of the resilient member 112.

Referring to FIGS. 6, 7 and 10, a first end of the retaining member 116 is attached to an attachment element 116d of the base board 111. The retaining member 116 extends from the attachment element 116d along a first side of the resilient member 112 and then enters a slot 116c in the lung plate 113. The retaining member 116 then extends across a part of the surface of the lung plate 113 and then enters another slot 116b in the lung plate 113. The retaining member 116 then extends along another side of the resilient member 112, this side being opposite to the first side, and then enters a slot 116a in the base board 111.

A second end of the retaining member 116, being in the opposite end as the first end, is arranged on the bottom side of the base board 111. The bottom side (shown on FIG. 7) faces away from the resilient members 112.

The second end comprises a loop part (not shown) having a plurality of tiny loops, such as products sold under the trademark Velcro®.

On the bottom side of the base board 111 is arranged a hook element 116e, which comprises a plurality of tiny hooks, such as products sold under the trademark Velcro®.

The loop part of the retaining member 116 and the hook element 116e allows the retaining member 116 to be fastened and kept in a tightened state in the storage position.

To release the retaining member 116 from the storage position, the loop part is removed from the hook element 116e, where after the force of the tensioned resilient member in the storage position, forces the lung plate and the chest board away from the base board, so that the torso part is quickly brought to its training position and is ready to use.

The skilled person will understand that the hook element 116e may be position any suitable place on the base board. Or may be a part of the retaining member itself.

The bottom side of the base board 111 may comprise cut out sections such as grooves to accommodate the hook element 116e, part of the attachment element 116d and the retaining member 116.

The base board 111 may further comprise a support element 116f (shown on FIG. 10), which supports the positioning and tightening of the retaining member 116.

FIGS. 6 and 7 further shows the plurality of apertures 111a near the circumference of the base board 111, and the plurality of snap lock protrusions 117a, which releasably attach the base end 117X of the flexible side wall to the base board 111.

FIG. 8 illustrates parts of the torso part 110 of the training manikin 100 in the storage position.

When the torso part is in the storage position, the lung plate 113 and the base board 111 are still arranged approximately parallel to each other but with a distance d_storage between each other.

Also shown is the curved shape of the lung plate 113. Referring to the longitudinal and transverse axis described in relation to FIG. 3, the lung plate is slightly curved along the longitudinal axis, the peak of the curve extending towards the base board 111 and the ends of the curve extending towards the chest board 114. The ends of the legs may flatten out.

The lung plate 113 is also slightly curved along the transverse axis. The peak of the curve, being on either sides of the longitudinal axis, extending towards the chest board 114 and the ends of the curve extending towards the base board 111. The outermost parts of the ends may extend towards the chest board 114.

The resting element 118 is also shown. The resting element 118 stopping the movement of the lung plate 113 towards the base board 111, when a force is applied to the chest board 114.

FIG. 9 shows a bottom view of the chest board 114 and the side wall 117 according to an embodiment of the invention.

The side wall 117 extends along the entire circumference 144c of the chest board 114.

The chest board 114 further comprises three moulding protrusions 114d. The moulding protrusions 114d are cylindrically shaped. The moulding protrusions 114d are used when the chest board 114 is created.

The chest board 114 may be formed by a moulding process.

The chest board 114 comprises a thinned area 114e. The thinned area has a thickness which is smaller than the rest of the chest board 114. The thinned area substantially corresponds to the surface area of the lung plate.

This ensures that the chest board fits the lung plate better (even with the lung bag positioned in between them). It also reduces the height of the final manikin in the storage position.

The chest board 114 further comprises two longitudinal grooves 114f. These allow the chest board 114 to be slightly bend/deformed during the ventilation part of the CPR training simulating the movement of a human chest.

Turning to the choice of materials according to an embodiment of the invention. In the below table an example of the choice of material is shown. The skilled person will understand, that like materials may be selected.

| Element | Material type |
| --- | --- |
| Chest board | Thermoplastic Elastomer (TPU) and/or Polypropylene (PP) |
| Side wall | Thermoplastic Elastomer (TPU) and/or Polypropylene (PP) |

-continued

| Element | Material type |
| --- | --- |
| Retaining member | Nylon |
| Main head element | Silicone |
| Face piece | Polyvinylchloride |
| Base board | Polycarbonate |
| Lung bag | Polyvinylchloride |
| Disposable ventilation bag | Polyethylene |

In an embodiment the resilient member in the form of a steel coil spring comprises a surface treatment. The surface treatment may be in the form of a zinc paint.

The spring may have the following dimensions;

diameter of approximately 33 mm, height of approximately 66-69 mm (in the expanded training position)

length of end part for inserting into the first retainer element of approximately 26 mm.

The skilled person will understand that many variations and deviations from the above exemplary embodiments are possible without parting from the gist of the invention.

What is claimed is:

1. A training manikin for practicing cardiopulmonary resuscitation, the manikin being collapsible into a storage position and expandable into a training position, said manikin comprising a torso part, the torso part comprising:

a base board, a chest board arranged approximately parallel with said base board, a lung plate intermediate the base board and the chest board and arranged approximately parallel with said base board and said chest board, a resilient member positioned between said base board and said lung plate, the resilient member being non-inflatable and having a first end connected to the base board and a second end opposed to said first end and connected to the lung plate, the resilient member having a resiliency adapted to simulate a resistance encountered in compressing a human chest and biased to move the lung plate and chest board, when an external force is not applied to the torso part, a training distance away from the base board, the training distance defining the training position, and a non-elastic retaining member comprising a rope or strap adapted to retain the lung plate and chest board a storage distance away from and parallel to the base board, the storage distance being smaller than the training distance and defining the storage position.

2. The training manikin of claim 1, wherein the torso part comprises at least two resilient members positioned between said base board and said lung plate, said at least two resilient members including the resilient member.

3. The training manikin of claim 2, wherein the manikin further comprises a lung bag positioned between the chest board and the lung plate.

4. The training manikin of claim 3, wherein the torso part further comprises a flexible side wall adapted to connect said chest board and said base board.

5. The training manikin of claim 4, wherein the flexible side wall is permanently attached to said chest board.

6. The training manikin of claim 4, wherein the flexible side wall is integrally moulded with a part of the chest board.

7. The training manikin of claim 1, wherein the chest board comprises a male part and the lung plate comprises a matching female part, the male part and the female part being adapted to guide placement of said chest board relative to the lung plate.

8. The training manikin of claim 1, wherein the chest board comprises a locking member adapted for attaching the chest board to said lung plate.

9. The training manikin of claim 8, wherein the locking member establishes a limited clearance distance so that the chest board can move in relation to the lung plate.

10. The training manikin of claim 1, further comprising a self-inflatable head part.

11. The training manikin of claim 1, wherein the resilient member is a steel coil spring.

12. The training manikin of claim 1, wherein the torso part comprises four resilient members, the four resilient members including the resilient member.

13. The training manikin of claim 3, further comprising a head part including a removable face piece.

14. The training manikin of claim 1, wherein the retaining member is adjustable to control an expansion of the resilient member between the training position and the storage position.

15. The training manikin of claim 14, further comprising a flexible side wall affixed to the chest board and detachably secured to the base board in the storage position.

16. The training manikin of claim 15, further comprising a lung bag, wherein the flexible side wall, the chest board, and the base board enclose the lung bag and the resilient member in the storage position.

17. The training manikin of claim 15, further comprising a head part including a self-inflatable main head element and a removable face piece removably attached to the self-inflatable main head element.

18. The training manikin of claim 1,
wherein the retaining member comprises a strap connecting the base board and the lung plate, the strap being adjustable to control an expansion of the resilient member between the training position and the storage position.

19. The training manikin of claim 17, further comprising a lung bag and a flexible side wall, the flexible side wall affixed to the chest board and detachably secured to the base board in the storage position, wherein the flexible side wall, the chest board, and the base board enclose the lung bag and the resilient member in the storage position.

20. The training manikin of claim 18, wherein the flexible side wall is integrally moulded with a part of the chest board.

21. The training manikin of claim 1, wherein the manikin further comprises a lung bag positioned between the chest board and the lung plate.

22. The training manikin of claim 1, wherein the torso part further comprises a flexible side wall adapted to connect said chest board and said base board.

23. The training manikin of claim 1, wherein the base board has a surface area larger than a corresponding surface area of the lung plate, and wherein the chest board has a surface area larger than a corresponding surface area of the lung plate, such that portions of the base board and the chest board extend laterally further than lateral edges of the lung plate.

* * * * *